United States Patent [19]

Rule et al.

[11] Patent Number: 4,637,504
[45] Date of Patent: Jan. 20, 1987

[54] COMBINATION RANGE AND MASTER CLUTCH ASSEMBLY

[75] Inventors: Robert D. Rule; Bruce A. Skaggs; Gerald E. King, all of Rockford, Ill.

[73] Assignee: Borg-Warner Corporation, Chicago, Ill.

[21] Appl. No.: 719,406

[22] Filed: Apr. 3, 1985

[51] Int. Cl.[4] ............................................. F16D 25/11
[52] U.S. Cl. .............................. 192/87.17; 192/87.19; 192/109 F
[58] Field of Search ............... 192/87.14, 87.16, 87.17, 192/87.18, 87.19, 85 AA, 85 A, 109 F, 52, 51

[56] References Cited

U.S. PATENT DOCUMENTS

| | | | |
|---|---|---|---|
| 2,920,732 | 1/1960 | Richards et al. | 192/87.18 X |
| 2,979,176 | 4/1961 | Voth | 192/87 |
| 3,032,157 | 5/1962 | Richards | 192/87 |
| 3,303,914 | 2/1967 | Richards | 192/87.17 |
| 3,391,767 | 7/1968 | Stow | 192/87.19 |
| 3,948,146 | 4/1976 | Maurer et al. | 192/109 F X |
| 4,046,160 | 9/1977 | Horsch | 192/87.18 X |
| 4,186,829 | 2/1980 | Schneider et al. | 192/109 F |

FOREIGN PATENT DOCUMENTS 727897 4/1980 U.S.S.R. ............................ 192/87.17

OTHER PUBLICATIONS

Page 7.02, Hydraulic Components Catalog, Sun Hydraulics Corp., Sarasota, Fla., Sep. 15, 1982.

*Primary Examiner*—Rodney H. Bonck
*Assistant Examiner*—Alan G. Towner
*Attorney, Agent, or Firm*—Julian Schachner

[57] ABSTRACT

A combination range and master clutch assembly includes a separator plate, at least one clutch, a fluid actuated main piston for engaging each clutch, and at least one fluid actuated accelerator piston. The separator plate and main piston define first and second main chambers in communication with each other. The main piston and each accelerator piston define an accelerator chamber. Sliding of each accelerator piston blocks communication between the main chambers. The assembly is controlled by providing fluid at an operating pressure which may be modulated between low and high pressures. Fluid is selectively delivered to an accelerator chamber at the operating pressure when it is below a threshold pressure level, and to both the accelerator chamber and its associated main chamber at the operating pressure when it is above the threshold pressure level.

13 Claims, 3 Drawing Figures

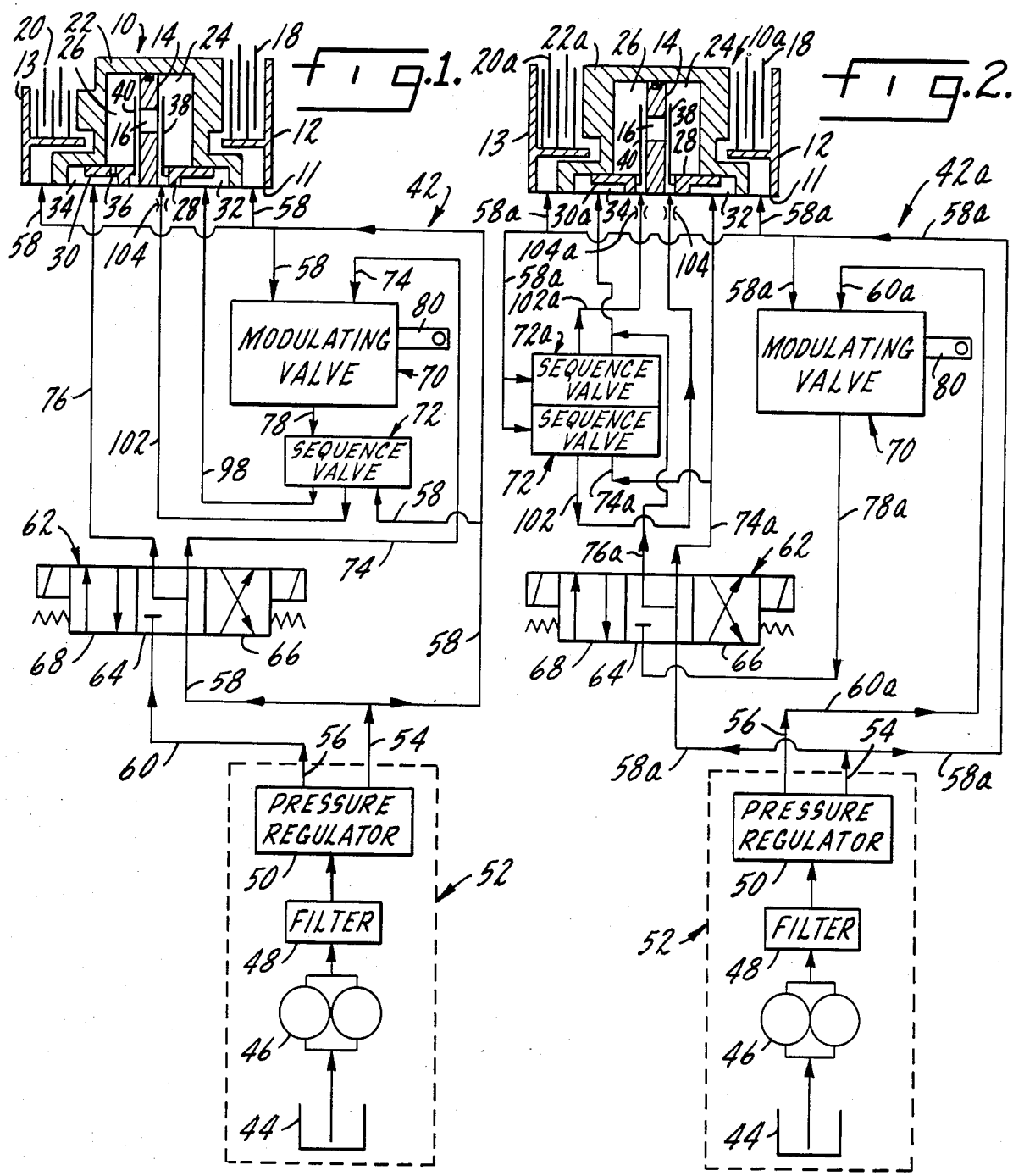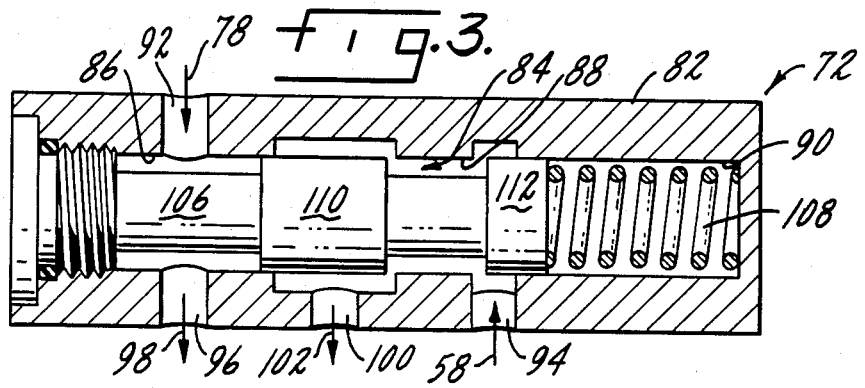

COMBINATION RANGE AND MASTER CLUTCH ASSEMBLY

BACKGROUND OF THE INVENTION

This invention relates generally to a combination range and master clutch assembly. More particularly, it relates to a fluid actuated, double acting clutch assembly which may be used both for high/low range selection (or forward/reverse direction selection) and for master clutching.

Heavy vehicles such as agricultural and industrial tractors and the like typically are provided with a master clutch which, when fully engaged, transfers full torque from the vehicle engine to the transmission. When partially engaged, the master clutch transfers partial torque to provide an inching function.

The transmission often is used in conjunction with a high/low range selecting mechanism to multiply the number of speed ratios obtainable from the transmission. Several varieties of range selecting mechanisms are currently available in the marketplace. One which has met with wide acceptance is basically of the type disclosed in U.S. Pat. No. 3,032,157 issued to Elmer A. Richards on May 1, 1962. This patent is of common assignee herewith, and is incorporated herein by reference.

Typically, both a master clutch and a range selecting mechanism are used in the driveline of a heavy vehicle. It would be desirable to provide a mechanism which combines these two functions, thereby eliminating the need for the master clutch. Thus there is a need in the art for a combination range and master clutch assembly.

SUMMARY OF THE INVENTION

This invention is directed to meeting this need. To that end there is provided a combination range and master clutch assembly including a separator plate, at least one clutch, a fluid actuated main piston for engaging the clutch, and at least one fluid actuated accelerator piston. The separator plate and main piston define first and second main chambers in communication with each other. The main piston and each accelerator piston define an accelerator chamber. Sliding of each accelerator piston blocks communication between the main chambers. The assembly is controlled by providing fluid at an operating pressure which may be modulated between low and high pressures. Fluid is selectively delivered to an accelerator chamber at the operating pressure when it is below a threshold pressure level, and to both the accelerator chamber and its associated main chamber at the operating pressure when it is above the threshold pressure level.

BRIEF DESCRIPTION OF THE DRAWING

The objects and advantages of this invention will become apparent to those skilled in the art upon careful consideration of the specification herein, including the drawing, wherein:

FIG. 1 is a schematic illustration of the combination range and master clutch assembly of this invention wherein one of the two range clutches is capable of functioning as a master clutch;

FIG. 2 is a schematic illustration of the combination range and master clutch assembly of this invention wherein either range clutch is capable of functioning as a master clutch; and FIG. 3 is a sectional view showing details of the sequence valve used in the control systems for the combination range and master clutch assembly of this invention.

While this invention may be embodied in many different forms, the preferred embodiment is illustrated in the drawing and described herein in detail. It should be understood that the present disclosure is considered to be an exemplification of the principles of the invention, and is not intended to limit the invention to this embodiment.

DESCRIPTION OF THE PREFERRED EMBODIMENT

Turning now to the drawing in greater detail and to FIG. 1 in particular, reference number 10 identifies the combination range and master clutch assembly of this invention. Assembly 10 is similar to the double acting clutch disclosed in the aforementioned U.S. Pat. No. 3,032,157.

Assembly 10 includes a shaft 11 supporting hubs 12 and 13. Shaft 11 also supports a separator plate 14 through which extend a plurality of passages 16, one of which is shown in the drawing. First and second range (or direction) clutches 18 and 20 are supported on hubs 12 and 13, respectively.

A main piston 22 is slidable on shaft 11 for selectively engaging clutches 18 and 20. Separator plate 14 and main piston 22 define first and second main chambers 24 and 26, respectively. These chambers are in fluid communication through passages 16.

First and second accelerator pistons 28 and 30 are slidable on shaft 11. Main piston 22 and accelerator piston 28 define a first accelerator chamber 32. Similarly, main piston 22 and accelerator piston 30 define a second accelerator chamber 34. Accelerator piston 30 defines an orifice 36 which communicates chamber 34 with chamber 26. Accelerator piston 28 does not define a similar orifice, so chambers 32 and 24 are not in direct communication. This is a departure from the disclosure in the aforementioned U.S. Pat. No. 3,032,157.

First and second disc valves 38 and 40 respectively extend into chambers 24 and 26. Each disc valve is movable by its associated accelerator piston into sealing contact with separator plate 14 so as to block fluid communication between chambers 24 and 26 through passages 16.

Assembly 10 also includes a control system 42. This control system includes a fluid reservoir 44, a pump 46, a filter 48 and a pressure regulator 50 which together constitute a source of fluid 52. Fluid source 52 has an output 54 providing fluid at a regulated low or lubrication pressure, for example 20 p.s.i., and an outlet 56 providing fluid at a regulated high or main pressure, for example 200 p.s.i.

Fluid lines 58 and 60, respectively, communicate outlets 54 and 56 with a selector valve 62. This valve is shown schematically as a three-position solenoid valve. It should be understood, however, that the valve need not be solenoid actuated, but may be actuated manually by the vehicle operator. Selector valve 62 has a neutral position 64, a first selecting position 66 and a second selecting position 68.

Line 58 also communicates with a modulating valve 70, with a sequence valve 72, and with assembly 10 to provide lubrication pressure for clutches 18 and 20.

With selector valve 62 in its neutral position, line 58 is in communication with lines 74 and 76. Line 74 delivers low pressure fluid to modulating valve 70, and line 76 delivers low pressure fluid to chamber 34 and, through orifice 36, to chamber 26.

Modulating valve 70 is available commercially and in itself forms no part of the present invention. One suitable valve is marketed by Sun Hydraulics Corporation of Sarasota, Fla., and is identified as a "Reducing-/Relieving Valve, Model PPHB". Briefly, modulating valve 70 delivers fluid to a line 78 at an operating pressure which may be modulated between the limits of the low pressure in line 58 and the high pressure in line 74. This modulation is controlled by an actuating rod 80, which preferably is connected to a clutch pedal, not shown, for manipulation by the vehicle operator. Of course, with selector valve 62 in its neutral position, low pressure is seen in both lines 58 and 74. Thus, in neutral the only pressure which can be seen in line 78 is this low pressure. Rod 80 has no effect when selector valve 62 is in neutral.

With particular reference to FIGS. 1 and 3, sequence valve 72 includes a valve body 82 which defines a bore 84 having bore portions 86, 88 and 90. A first inlet 92 communicates line 78 with bore portion 86. A second inlet 94 communicates line 58 with bore portion 88. A first outlet 96 communicates bore portion 86 and inlet 92 with a line 98, which in turn communicates with chamber 32. A second outlet 100 communicates either bore portion 86 or bore portion 88 with a line 102, which in turn communicates through an orifice 104 with chamber 24. Orifice 104 replaces the orifice not defined by accelerator piston 28.

A valve spool 106 is slidable in valve bore 84. A spring 108 in bore portion 90 biases valve spool 106 to the left as shown in FIG. 3. Bore portion 90 may be communicated with reservoir 44 through suitable means not shown. Valve spool 106 includes first and second lands 110 and 112. In the position shown in FIG. 3, land 110 prevents fluid communication from inlet 92 to outlet 100. Lands 110 and 112 together establish fluid communication from inlet 94 to outlet 100.

When the operating pressure in bore portion 86 reaches a predetermined threshold pressure level sufficient to overcome the biasing force of spring 108, for example 80 p.s.i., valve spool 106 shifts to the right. Land 110 prevents fluid communication from inlet 94 to outlet 100 and establishes fluid communication from inlet 92 to outlet 100. Fluid communication from inlet 92 to outlet 96 is maintained.

As shown in FIG. 1, assembly 10 is in the neutral position with clutches 18 and 20 disengaged. With low pressure in both lines 58 and 74, the operating pressure in line 78 is equal to the low pressure. Sequence valve 72 does not shift, and low pressure fluid is delivered through lines 98 and 102 to chambers 32 and 24. Low pressure also is delivered through line 76 to chambers 34 and 26.

In order to engage clutch 18, the operator moves selector valve 62 from neutral position 64 to first selecting position 66. Line 58 remains in communication with line 76 to maintain low pressure fluid in chambers 34 and 26. Line 60 now is in communication with line 74 to deliver high pressure fluid to modulating valve 70. As noted above, the position of rod 80 now determines the operating pressure in line 78.

So long as the operating pressure remains below the threshold pressure level, sequence valve 72 will not shift from the position shown in FIG. 3. Line 58 remains in communciation with line 102, which delivers low pressure fluid to chamber 24. However, operating pressure in line 78 is delivered through line 98 to chamber 32. Clutch 18 is partially engaged.

The extent of partial clutch engagement is determined by the operating pressure, which in turn is determined by the position of rod 80. Thus, by use of the clutch pedal, the vehicle operator may control this engagement. So long as the operating pressure is below the threshold pressure level, the operator may use clutch 18 to perform the inching function normally performed by a master clutch.

Sequence valve 72 shifts when the vehicle operator allows the operating pressure to exceed the threshold pressure level. Valve spool 106 moves to the right as shown in FIG. 3. Line 78 remains in communication with line 98. Land 110 prevents communication from line 58 to line 102 and establishes communication from line 78 to line 102. Operating pressure now is delivered to chamber 24 as well as chamber 32. Clutch 18 now may be fully engaged.

In order to engage clutch 20, the operator moves selector valve 62 to second selecting position 68. Line 58 communicates with line 74. With low pressure in both lines 58 and 74, the operating pressure in line 78 is equal to this low pressure. Sequence valve 72 does not shift, and low pressure fluid is delivered through lines 98 and 102 to chambers 32 and 24. Line 60 now is in communication with line 76 to deliver high pressure fluid to chambers 34 and 26. Clutch 20 engages in the manner disclosed in the aforementioned U.S. Pat. No. 3,032,157.

From the foregoing, it should be apparent that clutches 18 and 20 may be engaged selectively to provide range (or direction) selection. In addition, clutch 18 may be either partially engaged to provide the inching function of a master clutch, or fully engaged to provide the direct engaging function of a master clutch.

Turning now to FIG. 2 in particular, reference number 10a identifies a modified form of the combined range and master clutch assembly of this invention. Assembly 10a is essentially similar to assembly 10, except that clutch 20a has been modified so that it also may be partially engaged. To accommodate this modification, a modified main piston 22a has been provided. Also, a modified second accelerator piston 30a does not define an orifice communicating chamber 34 with chamber 26.

Assembly 10a includes a control system 42a. In this system, a fluid line 58a communicates outlet 54 with selector valve 62. Line 58a also communicates with modulating valve 70, with similar sequence valves 72 and 72a, and with assembly 10a to provide lubrication pressure for clutches 18 and 20a. Fluid line 60a communicates outlet 56 with modulating valve 70.

Modulating valve 70 delivers fluid to line 78a at an operating pressure which, as noted above, may be modulated between the limits of the low pressure in line 58a and the high pressure in line 60a. Line 78a delivers fluid at this operating pressure to selector valve 62.

As shown in FIG. 2, assembly 10a is in the neutral position with clutches 18 and 20a disengaged. Line 58a is in communication with lines 74a and 76a. Low pressure fluid is directed through line 74a to chamber 32 and sequence valve 72, and through line 76a to chamber 34 and sequence valve 72a. With low pressure seen in lines 58a, 74a and 76a, sequence valves 72 and 72a do not shift. Low pressure fluid is delivered through line 102 to chamber 24, and through a line 102a and an orifice 104a to chamber 26.

In order to engage clutch 18, the operator moves selector valve 62 from neutral position 64 to first selecting position 66. Line 58a remains in communication with line 76a to maintain low pressure fluid in chamber 34 and sequence valve 72a. Sequence valve 72a does not shift, and low pressure is maintained in chamber 26.

Line 78a now is in communication with line 74a to deliver operating pressure fluid to chamber 32 and sequence valve 72. So long as the operating pressure remains below the threshold pressure level, sequence valve 72 will not shift and low pressure fluid will be delivered through line 102 to chamber 24. Clutch 18 is partially engaged.

The extent of partial clutch engagement is determined by the operating pressure, which in turn is determined by the position of rod 80. As noted above, the vehicle operator may control this engagement by use of the clutch pedal. So long as the operating pressure is below the threshold pressure level, the operator may use clutch 18 to perform the inching function normally performed by a master clutch.

Sequence valve 72 shifts when the operator allows the operating pressure to exceed the threshold pressure level. Operating pressure now is seen in line 102, and is delivered to chamber 24 as well as chamber 32. Clutch 18 now may be fully engaged.

In order to engage clutch 20a, the operator moves selector valve 62 to second selecting position 68. Line 58a communicates with line 74a to deliver low pressure fluid to chamber 32 and sequence valve 72. This valve does not shift, and low pressure fluid is delivered through line 102 to chamber 24.

Line 78a now is in communication with line 76a to deliver operating pressure fluid to chamber 34 and sequence valve 72a. So long as the operating pressure remains below the threshold pressure level, sequence valve 72a will not shift and low pressure fluid will be delivered through line 102a to chamber 26. Clutch 20a is partially engaged.

As noted above, the operator may control the extent of partial clutch engagement by controlling the position of the clutch pedal. So long as the operating pressure is below the threshold pressure level, the operator may use clutch 20a to perform the inching function normally performed by a master clutch.

Sequence valve 72a shifts when the operator allows the operating pressure to exceed the threshold pressure level. Operating pressure now is delivered through line 102a to chamber 26. With operating pressure in chambers 34 and 26, clutch 20a now may be fully engaged.

It should be apparent that clutch 20 (FIG. 1) may be engaged simply by shifting selector valve 62 from neutral position 64 to second selecting position 68. This delivers high pressure to chamber 34 and, through orifice 36, to chamber 26. This feature is disclosed in the aforementioned U.S. Pat. No. 3,032,157.

By eliminating this orifice in accelerator pistons 28 and 30a (FIGS. 1 and 2), and by controlling the delivery of operating pressure to their associated accelerator and main piston chambers, clutches 18 and 20a may be partially or fully engaged, as desired, by the vehicle operator. Simply by manipulating the clutch pedal to maintain the operating pressure below the threshold pressure level, the vehicle operator may engage either clutch 18 or 20a partially. The shift from partial to full engagement is completed when the vehicle operator releases the clutch pedal sufficiently to allow the operating pressure to exceed the threshold pressure level, thereby causing the associated sequence valve 72 or 72a to shift.

Although this invention has been described as an assembly having two clutches, it is important to note that it is equally applicable to an assembly having only one clutch. Second clutch 20, second accelerator piston 30, and second disc valve 40 could be eliminated, with chamber 26 serving as a supplementary reservoir for chamber 24.

Thus a simple, inexpensive modification of the apparatus disclosed in the aforementioned U.S. Pat. No. 3,032,157, along with the introduction of a modulating valve and one or two sequence valves in the control system, results in a significant saving for the user. The master clutch may be eliminated, with the master clutching functions performed by the range (or direction) clutches.

It should be understood that while a preferred embodiment of this invention has been shown and described, it is to be considered as illustrative and may be modified by those skilled in the art. It is intended that the claims herein cover all such modifications as may fall within the spirit and scope of the invention.

What is claimed is:

1. A combination range and master clutch assembly comprising a separator plate, first and second clutches, fluid actuated main piston means slidable relative to said separator plate for selectively engaging said first and second clutches, said separator plate and main piston means defining first and second main chambers in communication with each other, first and second fluid actuated accelerator pistons slidable relative to said separator plate and main piston means, said main piston means and first and second accelerator pistons respectively defining first and second accelerator chambers, means responsive to sliding of said accelerator pistons for blocking said communication between said main chambers, and control means for providing fluid at an operating pressure which may be modulated between low and high pressures, said control means including means for modulating said operating pressure, said control means selectively delivering fluid to said first accelerator chamber at said operating pressure when it is below a threshold pressure level, and delivering fluid to said first accelerator and first main chambers at said operating pressure when it is above said threshold pressure level.

2. The combination range and master clutch assembly of claim 1, said control means also selectively delivering fluid to at least one of said second accelerator and second main chambers at one of said operating and high pressures when said operating pressure is below said threshold pressure level, and delivering fluid to said second accelerator and second main chambers at said one pressure when said operating pressure is above said threshold pressure level.

3. The combination range and master clutch assembly of claim 2, said second accelerator piston defining an orifice communicating said second accelerator chamber with said second main chamber, said delivery of fluid to at least one of said second accelerator and second main chambers being delivery to said second accelerator chamber directly and said second main chamber through said orifice, and said one pressure being said high pressure.

4. The combination range and master clutch assembly of claim 2, said delivery of fluid to at least one of said second accelerator and second main chambers being delivery to said second accelerator chamber, and said one pressure being said operating pressure.

5. The combination range and master clutch assembly of claim 2, said control means including modulating valve means receiving fluid at said low and high pressures and delivering fluid at said operating pressure, sequence valve means receiving fluid at said low and operating pressures, said sequence valve means delivering fluid at said low and operating pressures when said operating pressure is below a threshold pressure level, and delivering fluid at said operating pressure when it is above said threshold pressure level, and selector valve means movable between a neutral position and first and second selecting positions, said control means delivering fluid to said chambers at said low pressure when said selector valve means is in its neutral position, delivering fluid to said first accelerator chamber at said operating pressure while maintaining delivery of fluid to the other of said chambers at said low pressure when said selector valve means is in its first selecting position and said operating pressure is below said threshold pressure level, and delivering fluid to said first accelerator and first main chambers at said operating pressure while maintaining delivery of fluid to the other of said chambers at said low pressure when said selector valve means is in its first selecting position and said operating pressure is above said threshold pressure level, said control means also delivering fluid to at least one of said second accelerator and second main chambers at one of said operating and high pressures while maintaining delivery of fluid to the other of said chambers at said low pressure when said selector valve means is in its second selecting positon and said operating pressure is below said threshold pressure level, and delivering fluid to said second accelerator and second main chambers at said one pressure while maintaining delivery of fluid to the other of said chambers at said low pressure when said selector valve means is in its second selecting position and said operating pressure is above said threshold pressure level.

6. The combination range and master clutch assembly of claim 5, said second accelerator piston defining an orifice communicating said second accelerator chamber with said second main chamber, said delivery of fluid to at least one of said second accelerator and second main chambers being delivery to said second accelerator chamber directly and said second main chamber through said orifice, and said one pressure being said high pressure.

7. The combination range and master clutch assembly of claim 5, said delivery of fluid to at least one of said second accelerator and second main chambers being delivery to said second accelerator chamber, and said one pressure being said operating pressure.

8. The combination range and master clutch assembly of claim 5, said separator plate defining passage means extending therethrough, said first and second main chambers communicating through said passage means, and said blocking means including first and second disc valves in said first and second main chambers, said first and second disc valves respectively being movable by said first and second accelerator pistons for blocking said communication through said passage means.

9. The combination range and master clutch assembly of claim 8, said second accelerator piston defining an orifice communicating said second accelerator chamber with said second main chamber, said control means being constructed and arranged such that said sequence valve means delivers fluid to said first accelerator and first main chambers at said low pressure and said selector valve means delivers fluid to said second accelerator chamber at said low pressure when said selector valve means is in its neutral position, said sequence valve means delivers fluid to said first accelerator chamber at said operating pressure while said sequence and selector valve means maintain delivery of fluid to said first main and second accelerator chambers at said low pressure when said selector valve means is in its first selecting position and said operating pressure is below said threshold pressure level, and said sequence valve means delivers fluid to said first accelerator and first main chambers at said operating pressure while said selector valve means maintains delivery of fluid to said second accelerator chamber at said low pressure when said selector valve means is in its first selecting position and said operating pressure is above said threshold pressure level, and said control means also being constructed and arranged such that said selector valve means delivers fluid to said second accelerator chamber at said high pressure while said sequence valve means maintains delivery of fluid to said first accelerator and first main chambers at said low pressure when said selector valve means is in its second selecting position.

10. The combination range and master clutch assembly of claim 8, said control means being constructed and arranged such that said selector valve means delivers fluid to said first and second accelerator chambers at said low pressure and said sequence valve means delivers fluid to said first and second main chambers at said low pressure when said selector valve means is in its neutral position, said selector valve means delivers fluid to said first accelerator chamber at said operating pressure while said selector and sequence valve means maintain delivery of fluid to the other of said chambers at said low pressure when said selector valve means is in its first selecting position and said operating pressure is below said threshold pressure level, and said selector and sequence valve means respectively deliver fluid to said first accelerator and first main chambers at said operating pressure while maintaining delivery of fluid to the other of said chambers at said low pressure when said selector valve means is in its first selecting position and said operating pressure is above said threshold pressure level, and said control means also being constructed and arranged such that said selector valve means delivers fluid to said second accelerator chamber at said operating pressure while said selector and sequence valve means maintain delivery of fluid to the other of said chambers at said low pressure when said selector valve means is in its second selecting position and said operating pressure is below said threshold pressure level, and said selector and sequence valve means respectively deliver fluid to said second accelerator and second main chambers at said operating pressure while maintaining delivery of fluid to the other of said chambers at said low pressure when said selector valve means is in its second selecting position and said operating pressure is above said threshold pressure level.

11. A combination range and master clutch assembly comprising a separator plate, a clutch, fluid actuated main piston means slidable relative to said separator plate for engaging said clutch, said separator plate and main piston means defining first and second main chambers in communication with each other, a fluid actuated accelerator piston slidable relative to said separator plate and main piston means, said main piston means and accelerator piston defining an accelerator chamber, means responsive to sliding of said accelerator piston for blocking said communication between said main chambers, and control means for providing fluid at an operating pressure which may be modulated between low and high pressures, said control means including means for modulating said operating pressure, said control means delivering fluid to said accelerator chamber at said operating pressure when it is below a threshold pressure level, and delivering fluid to said accelerator and first main chambers at said operating pressure when it is above said threshold pressure level.

12. The combination range and master clutch assembly of claim 11, said control means including modulating valve means receiving fluid at said low and high pressures and delivering fluid at said operating pressure, sequence valve means receiving fluid at said low and operating pressures, said sequence valve means delivering fluid at said low and operating pressures when said operating pressure is below a threshold pressure level, and delivering fluid at said operating pressure when it is above said threshold pressure level, and selector valve means movable between a neutral position and a selecting position, said control means delivering fluid to said accelerator and first main chambers at said low pressure when said selector valve means is in its neutral position, delivering fluid to said accelerator chamber at said operating pressure while maintaining delivery of fluid to said first main chamber at said low pressure when said selector valve means is in its selecting position and said operating pressure is below said threshold pressure level, and delivering fluid to said accelerator and first main chambers at said operating pressure when said selector valve means is in its selecting position and said operating pressure is above said threshold pressure level.

13. The combination range and master clutch assembly of claim 12, said separator plate defining passage means extending therethrough, said first and second main chambers communicating through said passage means, and said blocking means including a disc valve in said first chamber, said disc valve being movable by said accelerator piston for blocking said communication through said passage means.

* * * * *